US005655857A

United States Patent [19]
Catenacci

[11] Patent Number: 5,655,857
[45] Date of Patent: Aug. 12, 1997

[54] BORING BAR TOOL WITH CUTTING INSERT

[76] Inventor: Thomas C. Catenacci, 45481 Nottingham, Macomb, Mich. 48044

[21] Appl. No.: 437,355

[22] Filed: May 8, 1995

[51] Int. Cl.$^6$ ................................................ B23B 29/02
[52] U.S. Cl. ........................... 408/233; 408/144; 408/713
[58] Field of Search ................................. 408/231–233, 408/144, 713

[56] References Cited

U.S. PATENT DOCUMENTS

| | | | |
|---|---|---|---|
| 5,125,774 | 6/1992 | Catenacci | 408/232 |
| 5,160,228 | 11/1992 | Arai et al. | 408/233 |

FOREIGN PATENT DOCUMENTS 647421  12/1950  United Kingdom ................... 408/144

*Primary Examiner*—Steven C. Bishop
*Attorney, Agent, or Firm*—Charles W. Chandler

[57] ABSTRACT

A tungsten carbide boring bar has a mechanism for securing the cutter insert in a passage in the boring bar. The boring bar has a transverse bore through the body of the tool. A steel plug is received in the bore closely adjacent the position of the insert. The plug has a central threaded passage. A retainer is threadably received in the plug and has an inner end seated in a notch in the shank of the insert to retain the tool in position, and an outer end adapted to receive a turning tool.

8 Claims, 2 Drawing Sheets

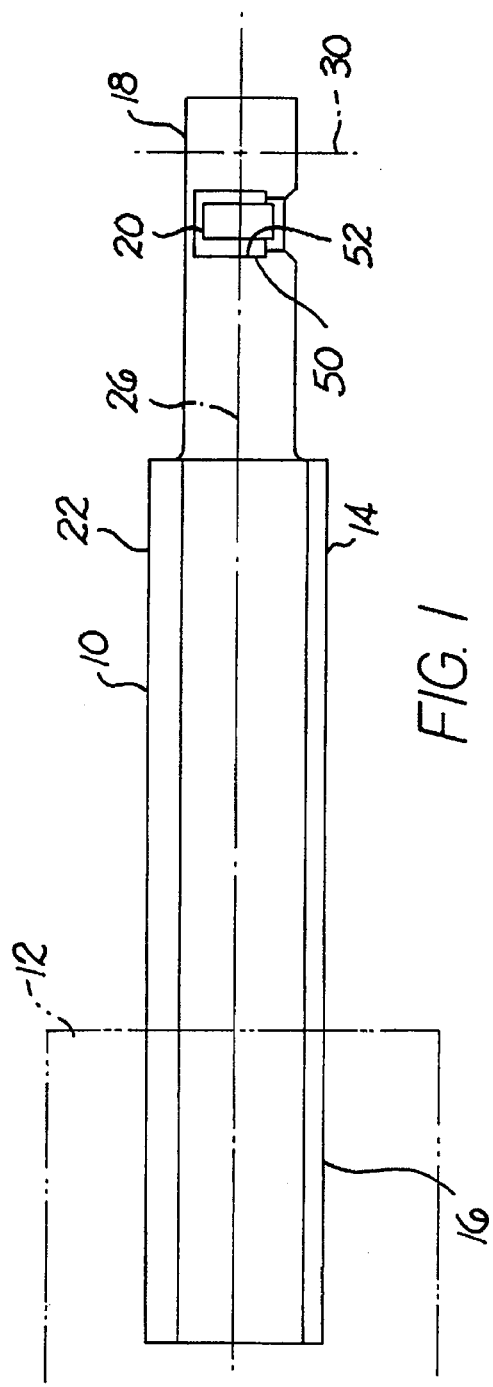
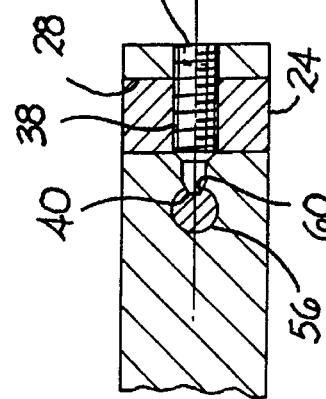
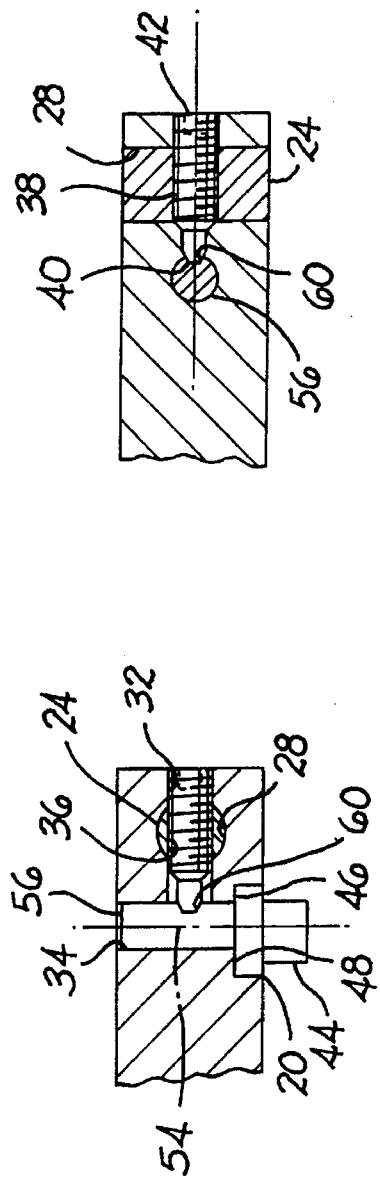

BORING BAR TOOL WITH CUTTING INSERT

BACKGROUND OF THE INVENTION

This invention relates to cutting tools, and more particularly to a tungsten carbide cutting tool and means for retaining a replaceable insert on the tool body without forming threads in the tungsten carbide.

Tungsten carbide is a material that is extremely difficult to form with threaded openings because it is relatively brittle. It has other properties that make it valuable as a tool material, such as when used as a boring bar tool holder.

One approach to mounting a retaining mechanism on a boring bar without forming any threaded openings in the tungsten carbide was disclosed in my U.S. Pat. No. 5,125,774 which was issued Jun. 30, 1992, for "Boring Bar Tool".

The boring bar has a replaceable insert on the forward end. The rear end has a retaining element mounted on a T-shaped transverse rib. A long locking member is threadably connected to the retaining element and extends through an axial bore in the boring bar from the rear end to a short passage containing the shank of the tool insert. Turning the locking member either engages a notch in the shank to retain it in position, or releases the shank to replace the insert.

One problem with this arrangement is that the rear end of the boring bar is usually mounted in some type of a holder so that the locking member is inaccessible for releasing and replacing the tool insert, without removing the boring bar from the tool holder.

SUMMARY OF THE INVENTION

The broad purpose of the present invention is to provide an improved boring bar tool having a replaceable insert in which the locking mechanism is mounted at the outer end of the bar, closely adjacent the insert, without forming a threaded bore in the tungsten carbide material.

In one embodiment of the invention, a steel plug is mounted between the passage supporting the shank of the cutter insert, and the extreme outer end of the boring bar. A smooth bore axial passage extends from the extreme outer end of the boring bar to the cutting shank passage and intersects the plug-receiving hole. The plug has a threaded opening for receiving a threaded retainer. The threaded retainer is mounted in the smooth bore passage and threaded in the plug. The inner end of the retainer engages the shank of the insert for either releasing or retaining the insert in position, depending upon the direction the retainer is turned.

In another embodiment of the invention, the steel retaining plug is mounted closely adjacent the shank-retaining passage of the insert in a smooth bore passage, but between the insert and the boring bar holder. The steel plug has a threaded passage. A threaded retainer is mounted in the smooth bore passage and connected to the plug such that the inner end of the retainer can engage the shank of the cutter insert, its outer end being adapted for receiving a turning tool for turning the retainer.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a side longitudinal view of a boring bar illustrating the invention;

FIG. 2 is a fragmentary longitudinal sectional view through the forward end of the boring bar;

FIG. 3 is a view similar to FIG. 2 but in which the boring bar has been rotated 90°;

DESCRIPTION OF THE PREFERRED EMBODIMENT

Figure 4:
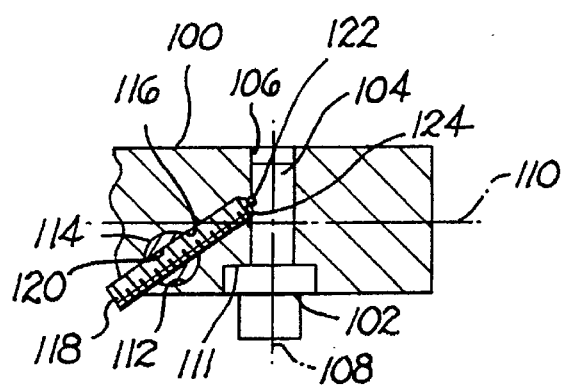
FIG. 4 is a transverse sectional view of another embodiment of the invention.
Figure 5:
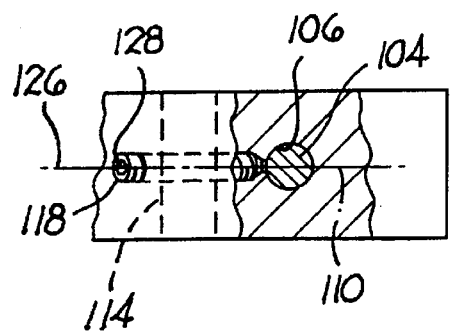
FIG. 5 is a view similar to FIG. 4 but in which the forward end of the boring bar has been rotated 90°.

Referring to the drawings, FIGS. 1, 2, 3 and 7 show a cutting tool 10 illustrating the invention adapted to be supported in a conventional boring bar tool holder illustrated in phantom at 12. Tool 10 comprises an elongated cylindrical boring bar 14 having a rear end 16 and a forward end 18. A replaceable cutter insert 20 is mounted adjacent the forward end of the boring bar.

The boring bar can be made in a variety of diameters and lengths depending upon the job requirements. For illustrative purposes the overall length of the boring bar is about 3.4". The boring bar is preferably of a two-piece construction comprising a tungsten carbide body 22, and a removable steel alloy plug 24. The body of the boring bar has a longitudinal axis 26. The plug is mounted in a smooth bore passage 28 formed along a transverse axis 30, as illustrated in FIG. 1. Axis 30 intersects and is transverse to longitudinal axis 26.

The boring bar body also has a smooth bored passage 32 formed along longitudinal axis 26 and extending from the extreme forward end of the boring bar, as illustrated in FIG. 2. Passage 32 extends to a shank-receiving passage 34 that also is disposed transverse to and intersects the longitudinal axis of the boring bar. Plug 24 has a centrally located threaded opening 36 aligned with passage 32.

An elongated threaded retainer 38 is received in smooth bored passage 32, and threadably engaged in the threaded opening of the plug. The retainer slides along the smooth bore of passage 32. The inner end of the retainer has a pointed tip 40 received in the shank receiving passage 34. The outer end of the retainer has a tool-receiving opening 42 for turning the retainer about its longitudinal axis. Turning the retainer in one direction moves tip 40 into the shank-receiving passage, turning the retainer in the opposite direction moves the tip away from the shank-receiving passage.

Cutter insert 20 has an outer cutting configuration 44, and a base with a flat surface 46 seated on a flat chordal surface 48 formed on the boring bar. The insert base has a straight side edge 50 engaging a transverse shoulder 52 to prevent the cutter insert from turning around axis 54 of an integral shank 56. Shank 56 tightly fits in passage 34.

Shank 56 has a notch 60 engageable with tip 40 of the retainer. When the tip of the retainer tightly engages the notch, the cutter shank is securely connected to the boring bar body so that it cannot be removed from the shank opening. When the retainer is turned by an Allen wrench (not shown) toward a release position so that the tip is separated from the shank notch, the insert shank can then be removed from the boring bar body by pulling it downwardly as viewed in FIG. 2.

Figure 6:
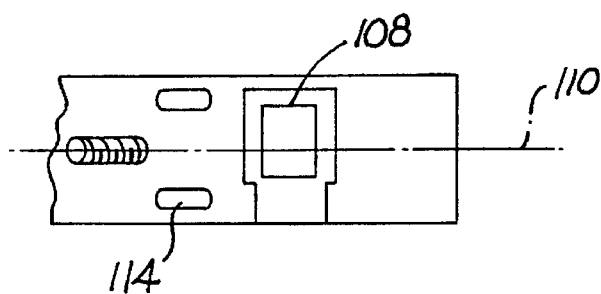
FIG. 6 is a view as seen from the bottom of FIG. 4.
Figure 7:
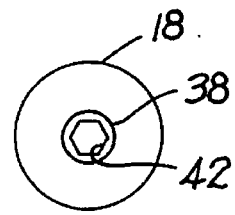
FIG. 7 is an enlarged view as seen from the right end of FIG. 1.

FIGS. 4 and 6 illustrate another embodiment of the invention in which a tungsten carbide boring bar has a rear end identical to the embodiment of FIG. 1, but a modified forward end 100. End 100 supports a cutting insert 102 identical to insert 20. Insert 102 has a shank 104 tightly disposed in a transverse shank-receiving passage 106. Passage 106 is formed about an axis 108 that is transverse to and intersects longitudinal axis 110 of the boring bar. The cutter insert and chordal flat seating configuration 111 are identical to the embodiment illustrated in FIG. 2. When the insert is seated on the chordal flat, the insert cannot rotate.

In this form of the invention, the body of the tool has a transverse cylindrical, smooth plug-receiving bore 112 which receives a tight-fitting steel plug 114. The body also has a smooth bored retainer-receiving passage 116 having an inner end that intersects shank-receiving passage 106 and an outer end that extends through the side of the tool body. An elongated threaded retainer 118 is threadably received in a threaded opening 120 in the midsection of the plug. The inner tip 122 of the retainer is seated in notch 124 of the shank. When the retainer tip is received and tightened in the notch, the tightening forces are transferred through the connection between the retainer threads in the threaded opening of the plug in the same manner as in the embodiment of FIGS. 1, 2 and 3. The retainer slides along the internal surface of passage 116. Passage 116 lies in a plane 126 that includes both the longitudinal axis of the tool body and the longitudinal axis of the cutter shank.

The plug can be slideably removed from the smooth bore in the boring bar body. The plug can take other configurations, however, a cylindrical configuration is preferred. The outer end of retainer 118 has a hexagonal opening 128 for receiving an Allen wrench for turning the retainer to either release or to engage the cutter shank.

Having described my invention, I claim:

1. In combination with a curing tool having an elongated boring bar having a longitudinal axis, a forward end, and a rear end adapted to be supported in a tool holder; the boring bar having a chordal flat adjacent said forward end, the boring bar having a shank-receiving passage extending from the chordal flat transversely to said longitudinal axis, a cutter insert having a shank received in said shank-receiving passage, and a seating surface disposed on the chordal flat, the improvement comprising:

said shank having a notch;

the boring bar having a slideable plug-receiving bore extending transversely to said longitudinal axis, and a smooth retainer-receiving passage extending transverse to said plug-receiving bore;

a retainer plug removeably disposed in said plug-receiving bore, the plug having a threaded opening aligned with said retainer-receiving passage; and a threaded retainer threadably mounted in the threaded opening of the plug and disposed in the retainer-receiving passage, the retainer having a first end receivable in the notch of the shank and a second end adapted to receive a tool for turning the threaded retainer either toward the notch to engage the shank, or away from the notch to permit removal of the shank from the first bore shank-receiving passage.

2. A cutting tool as defined in claim 1, in which said chordal flat defines a transverse shoulder, and said cutter has a straight edge surface abutting said transverse shoulder to prevent rotation of the cutter insert shank in said shank-receiving opening.

3. A cutting tool as defined in claim 1, in which the forward end of the boring bar is formed of tungsten carbide.

4. A cutting tool as defined in claim 1, in which the retainer-receiving passage is formed along the longitudinal axis of the boring bar and the threaded retainer is rotatable about said longitudinal axis.

5. A cutting tool as defined in claim 1, in which the retainer-receiving passage lies in a plane containing the longitudinal axis of the boring bar, and the threaded retainer is moveable along a path of motion forming an angle with said longitudinal axis.

6. A cutting tool as defined in claim 2, in which the plug-receiving passage is disposed between the shank of the insert and the extreme forward end of the boring bar.

7. A cutting tool as defined in claim 1, in which the plug-receiving passage extends transversely to the longitudinal axis of the boring bar and entirely through the boring bar.

8. A cutting tool as defined in claim 1, in which the retainer-receiving passage is inclined with respect to the longitudinal axis of the boring bar.

* * * * *

UNITED STATES PATENT AND TRADEMARK OFFICE
CERTIFICATE OF CORRECTION

PATENT NO. : 5,655,857
DATED : August 12, 1997
INVENTOR(S) : Thomas C. Catenacci It is certified that error appears in the above-identified patent and that said Letters Patent is hereby corrected as shown below:

Column 2
Claim 1, line 1, please delete "curing" and insert thereinstead --cutting--.

Signed and Sealed this

Seventh Day of October, 1997

Attest:

BRUCE LEHMAN

Attesting Officer       Commissioner of Patents and Trademarks